United States Patent [19]

Karlsson

[11] Patent Number: 4,684,316
[45] Date of Patent: Aug. 4, 1987

[54] IMPROVEMENTS IN WIND TURBINE HAVING A WING-PROFILED DIFFUSOR

[75] Inventor: Jan Karlsson, Gothenburg, Sweden

[73] Assignee: KB Vindkraft i Göteborg, Gothenburg, Sweden

[21] Appl. No.: 648,161

[22] PCT Filed: Dec. 27, 1983

[86] PCT No.: PCT/SE83/00480
§ 371 Date: Aug. 29, 1984
§ 102(e) Date: Aug. 29, 1984

[87] PCT Pub. No.: WO84/02750
PCT Pub. Date: Jul. 19, 1984

[30] Foreign Application Priority Data

Dec. 30, 1982 [SE] Sweden ................................ 8207495

[51] Int. Cl.⁴ .................................................. F03D 1/04
[52] U.S. Cl. ........................................ 415/2 A; 415/3
[58] Field of Search ............................. 415/2 A, 4 A

[56] References Cited

U.S. PATENT DOCUMENTS

| | | | |
|---|---|---|---|
| 766,219 | 8/1904 | Clemson | 415/4 A |
| 1,578,923 | 3/1926 | Schlotter | 415/3 A |
| 3,228,475 | 1/1966 | Worthmann | 416/11 X |
| 3,986,787 | 10/1976 | Mouton et al. | 415/2 A X |
| 4,021,135 | 5/1977 | Pedersen et al. | 415/2 A |
| 4,075,500 | 2/1978 | Oman et al. | 415/2 A X |
| 4,079,264 | 3/1978 | Cohen | 415/2 A X |
| 4,087,196 | 5/1978 | Kronmiller | 416/121 A X |
| 4,132,499 | 1/1979 | Igra | 415/2 A |
| 4,143,992 | 3/1979 | Crook | 415/3 A |
| 4,166,596 | 9/1979 | Mouton et al. | 415/2 A X |
| 4,258,271 | 3/1981 | Chappell et al. | 415/2 R |
| 4,320,304 | 3/1982 | Karlsson et al. | 415/3 A X |
| 4,324,985 | 4/1982 | Oman | 415/2 A X |
| 4,411,588 | 10/1983 | Curratt | 415/2 A |
| 4,422,820 | 12/1983 | Kirsch et al. | 415/4 A |
| 4,482,290 | 11/1984 | Foreman et al. | 415/2 A |

FOREIGN PATENT DOCUMENTS

| | | | |
|---|---|---|---|
| 729534 | 12/1942 | Fed. Rep. of Germany | 415/4 A |
| 883428 | 7/1953 | Fed. Rep. of Germany | 415/2 A |
| 675697 | 2/1930 | France | 415/4 A |
| 891697 | 3/1944 | France | 415/2 A |
| 975625 | 3/1951 | France | 415/2 A |
| 2255809 | 7/1975 | France | 415/3 A |
| 2425002 | 1/1980 | France | 415/4 A |
| 2507252 | 12/1982 | France | 415/2 A |
| 695519 | 8/1953 | United Kingdom | 416/189 A |

*Primary Examiner*—Everette A. Powell, Jr.

[57] ABSTRACT

Arrangement for wind turbines which comprise not only a rotor (2) which can be caused to rotate about a shaft by a flow of air moving essentially in the direction of the shaft from an inlet side towards an outlet side, but also an annular body (1) enclosing the rotor in a concentric fashion, said body exhibiting on its intended inlet side an inlet having an inner boundary edge in connection with which the rotor is arranged and which makes the transition on the outlet side of the annular body to a front, inner boundary for an outlet which widens out in the direction of the flow and which is terminated by means of a rear, outer boundary edge (19). The transverse profile of the annular body (1) corresponds to a wing profile, of which the rounded leading edge (7-9) forms the inlet, of which the pointed trailing edge (19) forms the outer boundary edge of the outlet, which is situated radially outside said front edge, of which the flatter side (6) forms the inlet face of the ducting and extends from the outer boundary edge (22) of the inlet rearwards and outwards as far as the outer boundary edge (19) of the outlet, and of which the curved side (16-18) forms the outlet.

3 Claims, 2 Drawing Figures

IMPROVEMENTS IN WIND TURBINE HAVING A WING-PROFILED DIFFUSOR

TECHNICAL FIELD

The present invention relates to an arrangement for wind turbines.

BACKGROUND

Wind turbines always incorporate a rotor, that is to say some form of vane wheel or blade wheel. This rotor may be exposed or may be connected to a ducting. By the use of such a ducting of appropriate design it is possible to produce an accelerated wind flow past the rotor. This may be achieved in two ways, either by means of an accelerator which is positioned ahead of the rotor and which has the effect of increasing the velocity of the air flow as it arrives and before it reaches the rotor, or by means of a diffuser which is positioned behind the rotor and which contributes to leading away the air flow behind the rotor so that said air flow does not constitute an impediment to the arriving air flow. The principle may also be explained in terms of the fact that the accelerator attempts to increase the dynamic pressure ahead of the rotor, leading to an increase in the velocity of the arriving air. The diffuser for its part distributes the air leaving the turbine over a greater volume by causing the air to be diffused, whereby the dynamic pressure will fall in spite of the fact that the static pressure may rise as a result of the reduction in the velocity of the air which takes place. It is usual for a turbine ducting to be provided with both an accelerator and a diffuser arrangement.

The use of such a velocity-increasing arrangement permits the wind to be utilized more effectively, especially in the case of low wind speeds. A conventional wind turbine must, in actual fact, be so executed as to be capable of withstanding the maximum wind force occurring at the place of installation or, in the event of means being provided for taking the turbine out of service at a certain wind force, of withstanding the maximum wind speed at which it is proposed to operate. This means that the rotor will possess a certain starting resistance, with the result that the turbine will not generate any power in low winds. The use of a ducting arrangement enables the limit value for the lowest wind speed to be reduced partly because the velocity of the wind is accelerated and partly because the rotor is able to be made smaller than in the case of an exposed rotor because of the higher wind velocity at which it operates, with the result that it is not exposed to the risk of damage to the same extent.

The smaller size of the rotor may also result in a lower manufacturing cost since certain parts of the rotor are replaced by a static component which can be made not only more robust, but often at a lower cost than the component which is to rotate. The power produced by a wind turbine bears a certain relationship to its frontal area, which is constituted only by the rotor in the case of an exposed turbine, whereas in the case of a ducted turbine it is constituted by the rotor together with the non-rotating ducting.

TECHNICAL PROBLEM

A duct of the aforementioned type often consists of an accelerator in the form of an inlet trumpet and a diffuser in the form of an exhaust trumpet. A trumpet of pure, conical form will, however, produce very limited acceleration because, if an attempt is made to exceed a certain ratio, the turbulence created in the trumpets will be so great that the intended gain will be eliminated by losses. Forms other than a pure cone have accordingly been proposed, although these have failed to produce the intended improvements.

THE SOLUTION

The problem of achieving high acceleration without excessively high turbulence losses is solved by the present invention in that the transverse section of the acceleration-producing, annular body corresponds essentially to a wing section of which the rounded leading edge forms an inlet of which the pointed trailing edge forms the outer boundary edge of an outlet which, when viewed radially, is situated outside said leading edge of which the flatter side forms the flow front of the body and extends rearwards and outwards from the outer boundary edge of the inlet as far as the outer boundary edge of the outlet, and of which the curved side forms the outlet.

ADVANTAGES

The present invention provides an arrangement for wind turbines which will produce acceleration of the air flow past the rotor of the turbine with lower turbulence losses than are achieved from previously disclosed arrangements such as ductings of the aforementioned type.

BRIEF DESCRIPTION OF THE DRAWINGS

The following description illustrates the invention with reference to the accompanying drawings. Of these.

BEST MODE OF CARRYING OUT THE INVENTION

Figure 1:
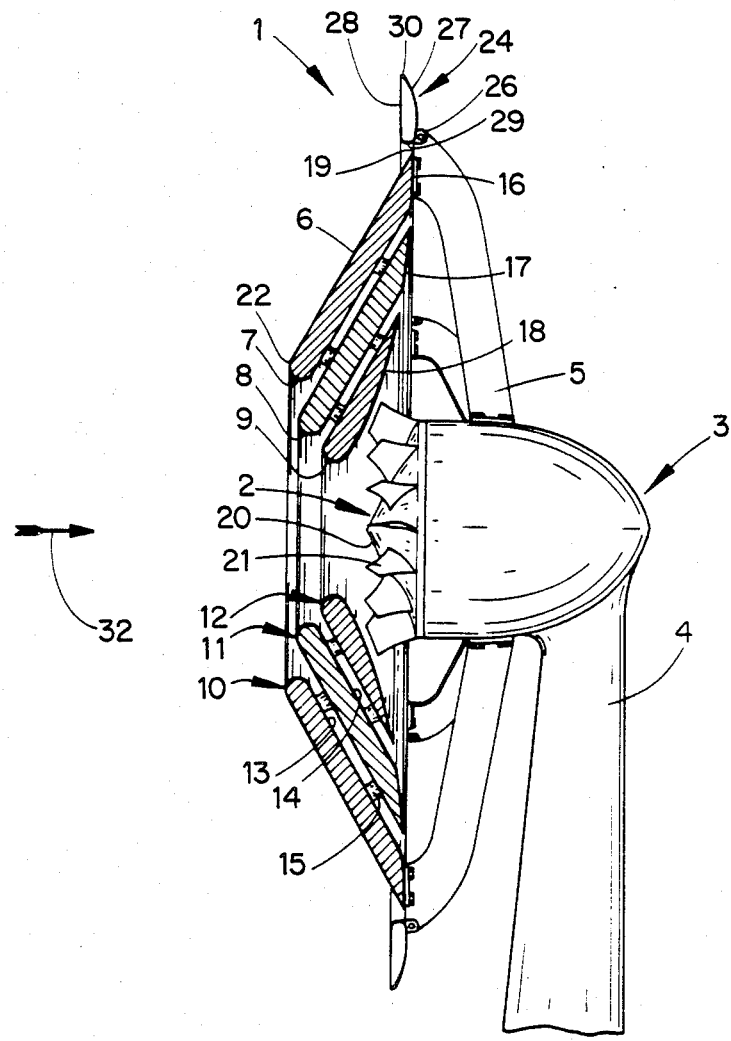
FIG. 1 is a radial section through the turbine and FIG. 2 is a front view.

The arrangement in accordance with the present invention may be said to relate to ducted turbines in which the rotor is surrounded by an annular body. This is not executed in the form of a duct, however, in the sense that it does not incorporate any diffuser of conventional type. The annular body surrounding the rotor is accordingly referred to below as the 'annular body'.

For the purposes of the invention the annular body preferably incorporates an accelerator on the inlet side of the turbine, although no diffuser is fitted on the outlet side, but rather a further accelerator to provide continued acceleration of the air behind the turbine. This produces a drop in static pressure behind the turbine, which produces an additional flow of air to and through the turbine. In the following description the accelerator on the inlet side is referred to as the 'pre-accelerator' and the accelerator on the outlet side as the 'post-accelerator'.

The foregoing is achieved in accordance with the invention by executing the annular body in the form of a circular, i.e. endless, wing with the flatter underside of the wing profile being situated on the inlet side, and with the more curved upper side of the wing profile being on the outlet side. The leading edge of the wing profile, the inner surface of which forms the pre-accelerator, is situated ahead of and radially within the trailing edge of the wing profile, which constitutes the extremity of the post-accelerator. The transverse section of the wing profile thus faces rearwards and radially outwards and may be said to constitute a truncated cone which widens out in the direction of the flow. The intention is that the exhaust air should follow the curved internal shape of the post-accelerator, thereby causing the air to be accelerated in the same way as the air passing over the upper surface of a wing is caused to accelerate, in so doing causing lower pressure to exist in that area. In order to achieve this effect, however, the air must be directed outwards, which is best done by means of a cone situated in the central hole of the annular body, said cone widening out in the direction of the flow and in so doing causing the air to be directed outwards. This cone may suitably constitute the hub of the rotor itself, and the turbine blades must accordingly be mounted on the cone.

In order to achieve the best effect the air flow along the inside of the post-accelerator must be as laminar as possible. It is possible to achieve and maintain the highest possible degree of laminar flow by causing the rapidly flowing air taken in ahead of the rotor to pass via ducts past the rotor and to exhaust on the inside of the post-accelerator essentially in the direction of the surface, so that the boundary layer between the surface of the body and the flowing air will be imparted with an energy-rich jet. Tests have shown that a significant air speed can be achieved in this way along the surface of the body. The test results show that it is possible in the manner described to produce a pressure drop of 13 mm $H_2O$ behind the rotor at a wind speed of 6 m/s, and of 200 mm $H_2O$ at 25 m/s.

Figure 2:
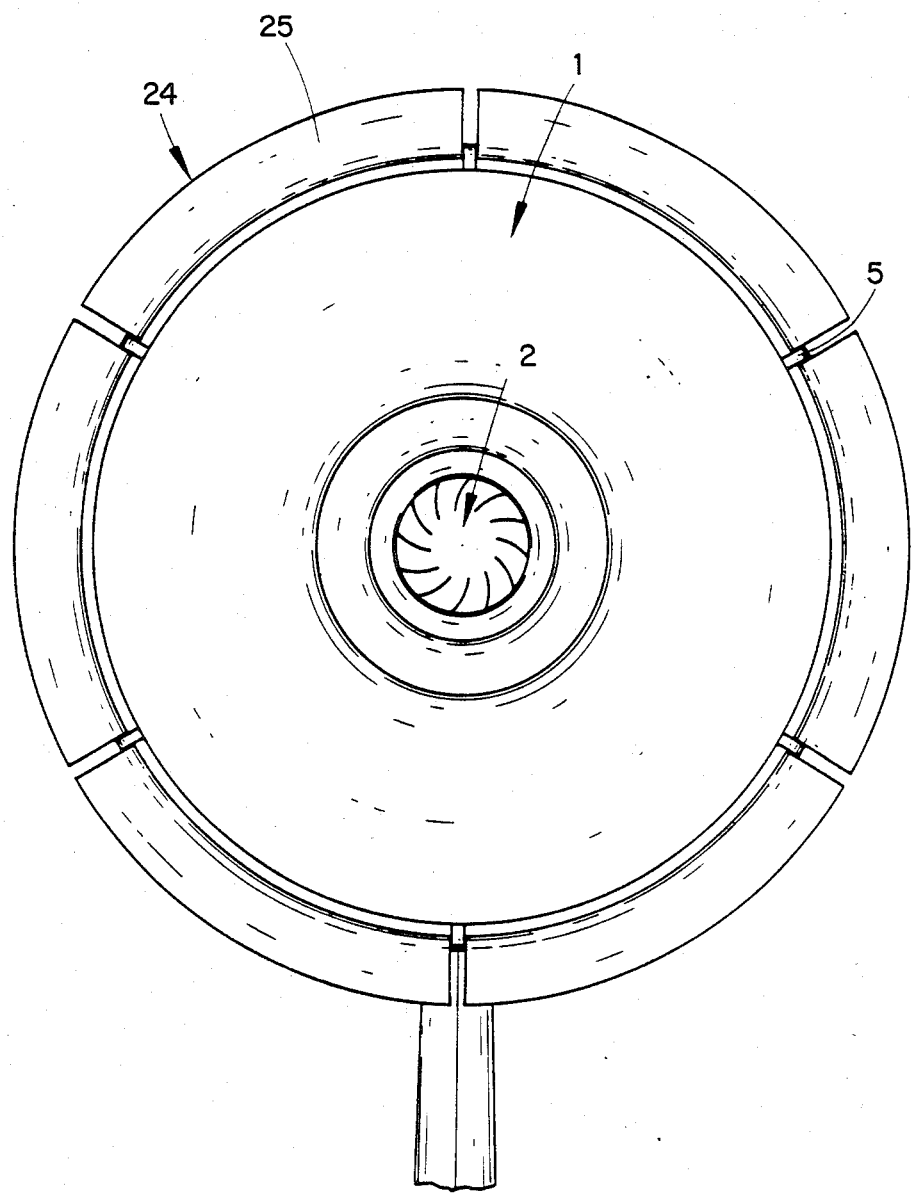

An embodiment of the turbine is described below with reference to the accompanying drawings. FIG. 1 shows a transverse section through the turbine, and FIG. 2 is a front view of same.

As may be appreciated from the Figures, the turbine includes the aforementioned annular body, indicated by the reference designation 1, and the rotor, indicated by the reference designation 2. The rotor 2 is supported by a fixed central body 3, which in turn is supported on a base via a mast 4. The central body 3 supports the rotor 2 by means of bearings, enabling the rotor to rotate. The rotor is intended in this way to drive the machine by means of which the wind power is to be utilized. This may be an electrical generator contained inside the central body 3 or a hydraulic pump, for example. As an alternative, the central body may contain a gear box to transmit the power from the rotor to machinery situated in the base via a shaft in the mast 4. Solutions of this kind for harnessing and transmitting the movement of the rotor have been disclosed previously, however, and need not be described in greater detail here.

In order to retain the annular body 1 in its position around the turbine 2 it is connected by means of radial arms 5 to the supporting central body 3.

From FIG. 1 it is apparent that the circular annular body 1 exhibits a radial transverse section capable of being inscribed within the outer contour of a wing profile. The annular body exhibits for this purpose an outer front surface 6 and an inner front surface, both on the inlet side, with the latter surface being formed by the front edges 7, 8 and 9 of three rings 10, 11 and 12 into which the annular body 1 is divided by means of two narrow gaps 13 and 14 which run through it. The front surface of the outer ring facing the inlet side forms said outer front surface 6 of the annular body. It should be pointed out that the outer ring 10 of the central body 3 is supported by these three rings via the arms 5, said outer ring in turn supporting the two remaining rings by means of the spacer elements 15.

The rear surface of the annular body on the exhaust side is formed by the end surfaces 16 and 17 of the two outer rings 10 and 11 and the surface 18 of the inner ring 12 facing the exhaust side.

As is already known, a wing profile consists of an outwardly curved 'upper surface' and a flat or convex 'lower surface' together with a rounded leading edge and a pointed trailing edge to which the 'upper and lower surfaces' are connected. Of these surfaces, the curved 'upper surface' on the wing body corresponds to the surfaces 16, 17 and 18, the flat 'lower surface' to the surface 6, the curved leading edge to the surfaces 7, 8 and 9, and the pointed trailing edge to the pointed trailing edge of the pointed transition 19 between the surfaces 6 and 16 on the outer ring 10. Unlike a normal wing, however, the annular body 1 is, as has already been mentioned, divided into three parts by the gaps 13 and 14. If, however, this three-part body is imagined to be enclosed by a shape which bridges over the openings of the gaps, it will be appreciated that the transverse section closely resembles that of a conventional wing profile. This wing profile is thus curved into the form of a ring, with its transverse section facing with its tapered 'trailing edge' 19 obliquely outwards from the centre and rearwards in relation to the direction of the flow.

If the annular body 1 is regarded from the point of view of the air flow, the surfaces 7, 8 and 9, the 'leading edge', form an inlet and the surfaces 16, 17 and 18, the 'trailing edge', form an outlet. The inlet and the outlet merge together at the innermost part of the surface, which thus forms the inner boundary edge of the inlet and the outlet and at the same time the passage through the body. The outer boundary edge of the inlet is formed by the transition 22 between the surfaces 6 and 7. The outer boundary edge of the outlet is formed by the point 19.

The rotor 2 consists partly of a hub 20 which widens out in a conical fashion in the direction of the flow, and partly of blades 21 supported by the outer part of the hub. The blades 21 are twisted in the form of a spiral in relation to the corresponding radius of the hub. The arriving air will consequently impart a twisting moment to the rotor. This manner of arranging turbine blades has been disclosed previously, and there is accordingly no need to describe the design of the blades in greater detail.

The Figures also show that outside the outer edge 19 of the annular body 1 is arranged a deflector 24, which may be said to correspond to the 'flaps' which are often arranged on the trailing edge of a wing profile. This deflector is divided into sections 25 in the form of circular ring sectors. Each and every one of these sections is able to rotate about pins 26 supported by the arms 5. The transverse section of the deflector, too, corresponds largely to that of a wing profile with a curved side 27 and a flat side 28, a rounded leading edge 29 and a pointed trailing edge 30. The deflector is not essential for the function outlined below, although it does provide the possibility of adjusting the turbine to suit different flow velocities, permitting its average efficiency to be improved over a wide range of different wind strengths. The adjustment of the amount of twist imparted to the sections 25 can be done manually, but should preferably take place via a mechanism controlled by the strength of the wind. This mechanism may consist of a sensor for detecting the strength of the wind and a hydraulic control device for adjusting the sections 25 into pre-determined positions depending on the strength of the wind.

When it is working, it is intended that the turbine should be so positioned as to face directly into the wind, which will thus arrive in the direction of the arrow 32 in FIG. 1. The air which meets that part of the front surface of the annular body 1 which is formed by the surfaces 7, 8 and 9 will, for the most part, be guided inwards towards the opening present within the surface 9 and will meet the turbine blades 21. The turbine will thus be caused to rotate, and the strength of the wind can thus be utilized in the manner outlined above. The air which meets the blades 21 will be directed outwards by the conically widening surface 20, and the air flowing through the turbine will leave the turbine in a sense which faces outwards at a steep angle. It will thus flow over the rear surface of the annular body 1 formed by the surfaces 16, 17 and 18, following its curvature. This will result in the acceleration of the outward and rearward flowing air. An area of negative pressure will be formed in this way, which will attempt to draw the arriving air through the turbine more rapidly. At the same time a certain level of acceleration will be created in the conical inlet formed by the surfaces 7, 8 and 9. Pre-acceleration and post-acceleration phenomena are thus produced which together provide the desired more rapid flow through the turbine. The air will thus flow through the turbine at a higher velocity than that of the air as it arrives at the arrangement.

That portion of the arriving air which meets the surface 6 will not be channelled towards the turbine wheel, but will be directed outwards. As it reaches the point 19 it will meet the air flowing along the surface 6, and it is important that the air flowing away should not be distributed in such a way as to have an adverse effect on the acceleration produced along the surfaces 16, 17 and 18. Disturbances of this kind can be avoided through the correct design of the surfaces on the inlet and outlet sides. It will be difficult or impossible, however, to produce an optimum design for all wind strengths. The use of the deflector 24 will, nevertheless, allow a high degree of adaptation to suit different wind strengths to be achieved by adjusting the deflector in such a way as to produce favourable acceleration characteristics.

The purpose of the gaps 13 and 14 is to cause a laminar boundary layer flow to occur over the surface formed by the surfaces 16, 17 and 18 on the outlet side. By releasing a very restricted flow of air through the rear openings of the gaps in the direction of the surface, a thin layer of air flowing in a laminar fashion along the surface will be produced, which will contribute towards maintaining the laminar flow of the main air flow from the turbine wheel which is essential if the aforementioned acceleration behind the turbine wheel is to be achieved.

This arrangement does not, however, constitute an essential part of the turbine in accordance with the invention. If the turbine is simplified in such a way that the annular body 1 is executed entirely without the gaps 13 and 14, in the manner of a true wing profile, the advantages of the invention can still be utilized, especially in small turbines, since it should be possible to achieve an essentially laminar flow for the air leaving the turbine wheel even in the absence of any such gaps.

I claim:

1. Wind turbine having a rotor comprising a hub and blades extending from said hub, an annular body positioned adjacent to said rotor concentric thereto and being formed of a plurality of concentric rings and having a front side comprising an inlet side for a flow of air and having an opposite back side comprising an outlet for the flow of air, said inlet side including an inlet opening which converges towards said rotor to accelerate air flowing into said inlet, said concentric rings each having an inner edge adjacent to said inlet opening, an outer portion of the front side of the annular body which has a form of a frustum of a cone the outer edge of the outermost one of said concentric rings forming the outer edge of the annular body and is positioned rearwards of said inner edges of said inlet side, an outer portion of the back side of the outermost concentric ring of said annular body having an outer edge connected to the outer edge of the front side outer portion of said annular body to form a sharp outer edge of the annular body, said back side having an inner portion positioned forwards of said sharp outer edge, the back side surfaces of said concentric rings of said annular body cooperating to form a convex shape which defines a hollow cone with a convex surface, the inner edge of said outermost concentric ring being curved and the inner edge of the innermost concentric ring being curved to define an overall rounded profile so that the cross-section in radial direction of the annular body corresponds substantially to a wing profile with the sharp outer edge of the annular body corresponding to the trailing edge of the wing profile, the rounded profile corresponding to the leading edge of the wing profile, the front side of the annular body corresponding to the flattened underside of the wing profile, and the back side of the annular body corresponding to the bowed upper side of the wing profile, and said blades of the rotor being positioned downstream the rounded profile.

2. Wind turbine according to claim 1, wherein narrow channels extending through the annular body are defined between said concentric rings.

3. Wind turbine according to claim 1 or 2, wherein a deflector corresponding to a flap of a wing profile is provided as a second annular body outside the sharp outer edge, a plurality of shafts mounted on said annular body, the deflector being divided into sections which are pivotable around said shafts, said shafts having axes which are located to be tangent to said annular body.

* * * * *